May 4, 1943.   R. I. BRADLEY   2,318,459
TEMPERATURE MEASURING INSTRUMENT
Filed July 1, 1941
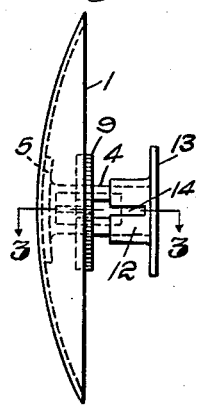
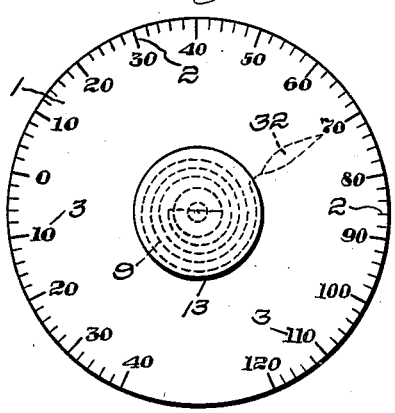
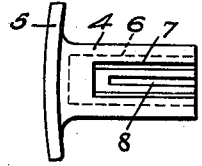
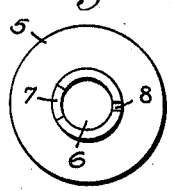
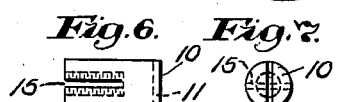
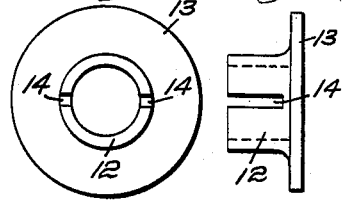
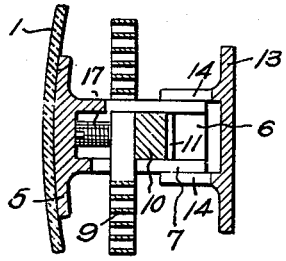
Inventor:
Robert I. Bradley
by Emery Booth Townsend Miller Weidner
Attys Patented May 4, 1943

2,318,459

UNITED STATES PATENT OFFICE 2,318,459

TEMPERATURE MEASURING INSTRUMENT

Robert I. Bradley, Belmont, Mass.

Application July 1, 1941, Serial No. 400,676

2 Claims. (Cl. 73—367)

This invention relates to temperature indicating devices, and it aims to provide an improved device of that nature which will be more compact in form, more sensitive, and accurate in its temperature indicating functions, and possessing other novel features, hereinafter described.

More and more our engineers and scientists, both those engaged in research and experimental work, and others engaged in industry, are demanding greater accuracy in the measurement and indication of temperature readings, both of the air, machinery, scientific instruments and other materials, and to that end everything promoting accuracy and sensitivity is of value.

The purpose of this invention, then, more specifically is to provide a novel, more accurate, sensitive, reliable and convenient temperature indicating device suitable for both scientific and every-day purposes.

In comparison with a glass or bulb thermometer, it is a fact that no matter how slight or thin the bulb may be, there is some retarding of heat which is caused by its passing through the glass before it meets the mercury or other medium used in this type of thermometer.

In comparison with other thermometers using bimetallic coils, if any, if they are enclosed, of course they are not so sensitive as is applicant's in the present case, where the coil is in direct contact with the air and circulating currents, and it will therefore pick up temperature changes directly and more quickly than otherwise. Also, by applicant's use of the free coil with a pointer integral therewith, he eliminates the use of bands, staffs and separate pointers, with their extra weight and friction, and this all tends to make the reading of applicant's thermometer more accurate and reliable as compared with other constructions. As time passes, corrosion on bearings has a very detrimental effect on the sensitivity and accuracy of the ordinary type of thermometer. Obviously, using applicant's type coil, there can never be any increasing detrimental effect with the passing of time from the above causes.

In the drawing of the present illustrative and descriptive embodiment of my invention:

Fig. 1 is a face view, with certain parts shown in dotted lines;

Fig. 2, an edge view from the right, Fig. 1;

Fig. 3, a broken, vertical section, on an enlarged scale, looking in the direction of the arrows, on the line 3—3, Fig. 2;

Fig. 4, a side elevation of the disk post or support;

Fig. 5, an end view of the head or top of the post from the right-hand end, Fig. 4;

Fig. 6, a side view of the coil supporting post or anchor;

Fig. 7, a lower end view from the right, Fig. 6, of the coil post;

Fig. 8, a plan or face view of the disk post base;

Fig. 9, a side elevation of the same.

Referring to Figs. 1 to 9, in general the type of construction, as shown in these figures, is the disk type of housing, although it may be of any other preferred shape, with a dial of graduations, and a centrally mounted coil of bi-metallic or other suitable, very sensitive, accurate temperature responsive material, preferably with an integral pointer, and particularly adapted for temperature indications for house and automobile use.

In the present instance, the housing 1 is a disk concavo-convex in form, preferably of transparent or translucent material, as glass or a plastic, so that the divisions and characters may be read by looking through from either face, and of course of any convenient size, depending largely upon its field of use, with computing graduations 2 and figures or other computing characters 3, conveniently arranged, as about its edge, forming the dial. The disk and coil supporting post 4, Figs. 2, 4, may be of any suitable material, as herein of plastic, and its head 5, Fig. 5, conveniently secured, mechanically or otherwise, to the inner face of the disk 1, as cemented thereto, by any suitable cement, as B. B. 292. The post 4, Fig. 4, has a chamber or passage 6 therein, and channels 7, 8, in its side walls opening into the chamber or passage 6 to receive the inner end of the coil 9 and leave the walls resilient to facilitate frictional adjustment thereof when assembled, or when necessary, as later described.

The anchor for the coil, Fig. 6, is a headless stud 10, as of metal or plastic, which slides with a close, friction fit into the passage 6 with a diametrical slot 15 to receive the coil inner end, Fig. 7, in the post 4, and with a slot 11 on its closed end, Figs. 6, 7, to receive a screw driver or other convenient instrument for adjustment of the stud and the coil axially relatively to the dial on the disk face when assembled.

The open end of the post 4 is received within the neck or collar 12 of the base 13, Figs. 8, 9, which, in turn, is mounted by any convenient means, as suitable cement, on the window or other support for the instrument, not shown. The post 4 is split, as stated, at 7, 8, and collar 12 at 14, respectively, to enable them to yield a little and grip tightly the post 4 when inserted therein.

In Fig. 3, the coil 9 is shown on an enlarged scale as mounted in the stud 10, and the latter, Fig. 6, frictionally held by the inner wall of the post 4. In assembling, the inner end of the coil spring 9 is inserted in the channel 15 of the stud 10 and the stud 10 is then inserted in the passage 6, the coil spring end passing through the channel 7 and may be locked in substantially proper position on the solid inner end of the stud by a screw 17 threaded to the interior wall of the stud 10, Figs. 3, 6, as described, and obviously the stud 10 and coil 9 thereon may be thereafter adjusted at any time in the post 4 longitudinally thereof as may be necessary by a screw driver, the slot 11 and channel 7 described.

The coil, mounted at its inner end as shown and described and having its outer end fashioned into a pointer 32, and thus without a bearing, has several compensating advantages, viz., it is a much simplified form of construction, the absence of a movable pivot and bearing therefor at the center on which the pointer would move avoids expense and simplifies assembly of parts, and it eliminates possible frictional and other troublesome factors, which always enter into delicately adjusted devices of this kind, causing corrosion and expense for repair as time passes. The compensating coil as shown in Fig. 1 is really a complete temperature indicating instrument in itself.

The foregoing device embodies simplicity of design, economy in construction, and sensitiveness and accuracy in operation.

My invention is not limited to the precise construction shown herein, but may be modified in many details, without departing from the spirit of the claims, and within the scope thereof.

I claim:

1. A thermometer comprising a housing, a supporting post and base therefor with an elongated chamber in the post, said post and base secured to and supporting the inner wall of the housing, a dial on the housing with computing graduations and characters, a channel in the post wall leading to said chamber, a temperature responsive coil mounted in said post channel and with a pointer movable over said dial, said coil comprising a plurality of materials of varying coefficiency of responsiveness to temperature, a coil anchor element adjustably mounted in the chamber of said post, means for adjustably locking the coil thereto, and a base member on the opposite end of said post to carry the same and secure it to a thermometer support.

2. A thermometer comprising a dial housing with graduations and temperature indicating characters thereon, a supporting post for the housing secured thereto and having an axial chamber therein, the post having an opening and a channel leading into said chamber, a slotted stud having a threaded opening axially of the slot extending into the chamber and frictionally held for rotatable adjustment, an element threaded in the opening of the stud, a temperature responsive coil having a pointer at the outer end thereof cooperating with said graduations, the inner end of the coil extending through the channel of the post and into the slot of the stud, said element locking the inner end of the coil against the end wall of the slot, whereby the coil is anchored and adjustably mounted for correct indication of temperature.

ROBERT I. BRADLEY.